United States Patent
Anderson et al.

(10) Patent No.: US 9,102,326 B2
(45) Date of Patent: Aug. 11, 2015

(54) HYBRID ASSEMBLY FOR AN AIRCRAFT

(71) Applicant: Embry-Riddle Aeronautical University, Inc., Daytona Beach, FL (US)

(72) Inventors: Richard Anderson, Daytona Beach, FL (US); Lori Costello, Daytona Beach, FL (US); Charles Eastlake, Daytona Beach, FL (US); Glenn P. Greiner, Daytona Beach, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 252 days.

(21) Appl. No.: 13/785,737

(22) Filed: Mar. 5, 2013

(65) Prior Publication Data

US 2013/0227950 A1    Sep. 5, 2013

Related U.S. Application Data

(60) Provisional application No. 61/606,751, filed on Mar. 5, 2012, provisional application No. 61/606,754, filed on Mar. 5, 2012.

(51) Int. Cl.
*F01B 21/04*    (2006.01)
*B64C 1/00*    (2006.01)
(Continued)

(52) U.S. Cl.
CPC .............. *B60W 20/40* (2013.01); *B64D 27/24* (2013.01); *B64D 35/08* (2013.01); *F01B 21/00* (2013.01); *B64D 2027/026* (2013.01); *Y02T 50/64* (2013.01); *Y10S 903/902* (2013.01)

(58) Field of Classification Search
CPC ....... B60W 20/40; B64D 27/24; B64D 35/08; B64D 2027/026; F01B 21/00; Y02T 50/64; Y10S 903/902
USPC ....... 244/4 R, 62; 903/905, 906, 912; 60/706, 60/716, 719
See application file for complete search history.

(56) References Cited

U.S. PATENT DOCUMENTS 2,007,878 A    7/1935    Schulman
2,604,276 A    7/1952    Huben
(Continued)

OTHER PUBLICATIONS

Invitation to Pay Additional Fees and, where Applicable, Protest Fee dated Jan. 23, 2014 in PCT/US2013/037409 filed Apr. 19, 2013.
(Continued)

*Primary Examiner* — Hoang Nguyen
(74) *Attorney, Agent, or Firm* — Womble Carlyle Sandridge & Rice LLP

(57) ABSTRACT

A propeller driven aircraft powered by either an internal combustion engine or an electric motor. The parallel system hybrid aircraft can takeoff with the internal combustion engine and climb to a cruising altitude. The internal combustion engine then can be turned off and the electric motor turned on to power the aircraft's propeller. The aircraft is capable of alternating operation between the electric motor and internal combustion engine as often as required at altitude. The aircraft can be landed using either the internal combustion engine or the electric motor. The transition of power from the internal combustion engine to the electric motor and back is performed through a hybrid clutch and pulley assembly that interconnects the internal combustion engine propeller flange to the propeller driveshaft. The electric motor is connected to the hybrid assembly through belts and sheaves. The electric motor throttle is controlled in the cockpit.

23 Claims, 4 Drawing Sheets

(51) Int. Cl.
  *B64C 27/00* (2006.01)
  *B60W 20/00* (2006.01)
  *B64D 35/08* (2006.01)
  *F01B 21/00* (2006.01)
  *B64D 27/24* (2006.01)
  *B64D 27/02* (2006.01)

(56) References Cited

U.S. PATENT DOCUMENTS

| | | | |
|---|---|---|---|
| 3,084,889 | A | 4/1963 | Irbitis |
| 4,998,995 | A | 3/1991 | Blythe |
| 5,743,489 | A | 4/1998 | Stemme |
| 6,550,719 | B2 | 4/2003 | Konig |
| 7,231,997 | B2 | 6/2007 | De Roche |
| 2008/0166934 | A1 | 7/2008 | Levander et al. |
| 2008/0184906 | A1 | 8/2008 | Kejha |
| 2010/0038473 | A1* | 2/2010 | Schneider et al. ............. 244/60 |
| 2010/0083631 | A1 | 4/2010 | Foster et al. |
| 2010/0188304 | A1 | 7/2010 | Clymer et al. |
| 2011/0073717 | A1* | 3/2011 | Foucault et al. ............ 244/53 R |
| 2011/0108663 | A1* | 5/2011 | Westenberger ................ 244/60 |
| 2011/0168118 | A1 | 7/2011 | Li et al. |
| 2012/0025032 | A1 | 2/2012 | Hopdjanian et al. |
| 2012/0209456 | A1 | 8/2012 | Harmon et al. |

OTHER PUBLICATIONS

International Search Report and Written Opinion for related PCT application, No. PCT/US/2013/037409, mailed Mar. 25, 2014.

* cited by examiner

HYBRID ASSEMBLY FOR AN AIRCRAFT

CROSS-REFERENCE TO RELATED APPLICATIONS

This application claims the benefit of U.S. Provisional Patent Application Ser. No. 61/606,751 filed on Mar. 5, 2012 and U.S. Provisional Patent Application Ser. No. 61/606,754 filed on Mar. 5, 2012. The specification and drawings of the provisional patent applications are specifically incorporated by reference herein. This application is related to co-pending and commonly assigned U.S. application Ser. No. 13/785,605 filed concurrently herewith.

TECHNICAL FIELD

Embodiments of the invention generally relate to hybrid aircraft and, more specifically, to hybrid power systems that can operate independently of each other during powered flight.

BACKGROUND

Propeller driven aircraft traditionally rely upon an internal combustion engine to power the propeller. The internal combustion engine is fueled by petroleum which emits carbon dioxide into the atmosphere. To reduce the dependency on petroleum fuel and its byproduct emission into the atmosphere, alternative propulsion means, such as electric motors, are being researched. This alternative device needs to provide sufficient power, at a minimum, to sustain level cruise flight at altitude. This alternative device should also be capable of addition to an existing aircraft as an independent power system.

Having an alternative power source will reduce the petroleum fuel consumed in addition to reducing the aircraft's noise. The duration of the flight using the electric motor system will be dependent upon the capacity of the battery system.

SUMMARY

The embodiments disclosed are directed to a hybrid aircraft that can be powered by either an internal combustion engine or an electric motor. The two power systems function independently of one another, but are interconnected through a hybrid clutch and pulley assembly to power the propeller. The two systems are interconnected using a hybrid assembly such that the internal combustion engine could power the propeller independently of the electric motor, and the electric motor could power the propeller independently of the internal combustion engine. This can be achieved using a hybrid assembly that allows the two systems to operate in parallel.

The hybrid assembly has a belt housing that allows an electric motor to be connected to it. This electric motor can then be connected to the internal combustion engine using brackets and turnbuckles. The electric motor is connected to the hybrid assembly by drive belts.

In an exemplary embodiment, a hybrid aircraft propulsion system is provided. The system includes a driveshaft, an internal combustion engine mounted on the driveshaft to power an aircraft's propeller, and an electrical motor that operates the aircraft propeller independently of the internal combustion engine. A hybrid assembly interconnects the internal combustion engine and electric motor to the driveshaft such that the electric motor and internal combustion engine operate in parallel to power the propeller independently.

In an exemplary embodiment, a propeller driven aircraft can be powered by either an internal combustion engine or an electric motor in a parallel hybrid system. The hybrid aircraft can takeoff with the internal combustion engine and climb to a cruising altitude. The internal combustion engine can then be turned off and the electric motor turned on to power the aircraft's propeller at altitude. The aircraft is capable of alternating operation between the electric motor and internal combustion engine as often as required at altitude. The aircraft can be landed using either the internal combustion engine or the electric motor. The transition of power from the internal combustion engine to the electric motor and back to the internal combustion engine is performed through a hybrid clutch and pulley assembly that interconnects the internal combustion engine propeller flange to the propeller driveshaft. The electric motor is connected to this hybrid assembly through belts and sheaves. The electric motor throttle is controlled in the cockpit.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

DETAILED DESCRIPTION

Figure 1:
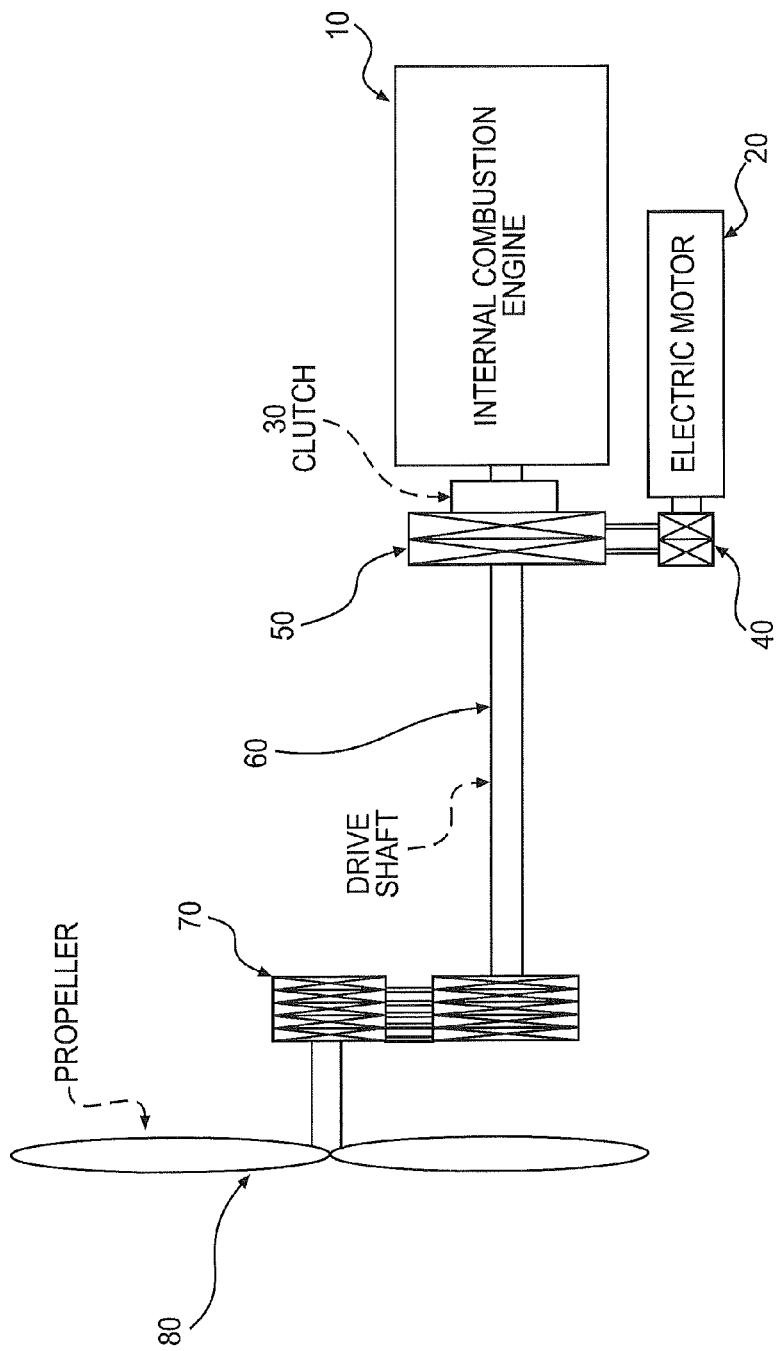
FIG. 1 illustrates a hybrid propulsion system including the internal combustion engine, electric motor, and propeller in accordance with an exemplary embodiment of the invention.

The following detailed description is provided as an enabling teaching of embodiments of the invention. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

This application is related to co-pending and commonly assigned U.S. application Ser. No. 13/785,605 filed concurrently herewith. The co-pending patent application is hereby incorporated by reference in its entirety into this description.

In exemplary embodiments, an electric motor is added to an airplane in order to provide power to the propeller at altitude and maintain level flight without the need for the internal combustion engine. The electric motor system is independent of the internal combustion engine system, but must also be connected to the propeller's driveshaft in such a way so that either the internal combustion engine or the electric motor can power the airplane's propeller. This can be achieved by connecting the two systems in parallel with each other.

In one embodiment, an internal combustion engine powered airplane, with a driveshaft to power a single propeller, can be modified to include an electric motor. The two power systems could be interconnected using a hybrid assembly such that the internal combustion engine can power the propeller independently of the electric motor, and the electric motor can power the propeller independently of the internal combustion engine. This can be achieved using a hybrid assembly that allows the two systems to operate in parallel.

In one embodiment, an existing airplane, with an internal combustion engine internally mounted aft of the pilot within the fuselage, can be modified. The airplane's existing driveshaft can be connected to the engine's propeller flange via a spline coupler and flexible disc. The existing driveshaft can travel forward to a pulley system located forward of the pilot. The pulley system serves as a minor gear ratio reduction in addition to allowing for propeller clearance with the ground.

In one embodiment, to increase the efficiency of the airplane, the internal combustion engine can be replaced with a more efficient engine reducing its fuel consumption. This engine replacement allows the hybrid assembly to be directly connected to the engine's propeller flange. The original driveshaft can then be connected to this hybrid assembly using the spline coupler and a flex-plate now attached to the hybrid assembly. The engine replacement in this embodiment may require the need to shorten the driveshaft unless the propeller can be mounted further forward.

The hybrid assembly has a belt housing that allows an electric motor to be connected to it. The electric motor can then be connected to the internal combustion engine using brackets and turnbuckles. The electric motor can be connected to the hybrid assembly by drive belts.

FIG. 1 illustrates a hybrid propulsion system for a light single engine airplane design with a forward-mounted propeller in an exemplary embodiment. The propulsion system includes an internal combustion engine 10 which is connected to an electric motor 20 through a hybrid clutch and pulley system. The hybrid clutch 30 is connected to the internal combustion engine propeller shaft and is attached to a sheave 50 that is then connected to another sheave 40 which is mounted to the electric motor shaft. Connected to the hybrid clutch 30 and the sheave 50 that is mounted onto the internal combustion engine propeller shaft is the driveshaft 60 that translates power to the propeller 80. Positioned between the driveshaft 60 and the propeller 80 could be a pulley system 70 that translates power to the propeller 80 that is not in line with the driveshaft 60.

In an exemplary embodiment, the electric motor 20 can be mounted to the internal combustion engine 10 by means of turnbuckles. The turnbuckles allow the electric motor sheave 40 to move toward the internal combustion engine sheave 50 in order to easily replace the belts connecting the two sheaves together. The electric motor 20 can be connected to the internal combustion engine 10 in order to ensure that the two systems vibrate and move together.

In one embodiment, a spline connects the driveshaft 60 to the sheave 50 that is connected to the hybrid clutch 30 and the internal combustion engine 10. The style of the sheaves 40 and 50 can be different and their size may vary depending upon the revolutions per minute (RPM) output by each system and the final RPM desired at the propeller 80. The belts used are based upon the sheaves 40, 50 and pulleys 70 that are used.

The driveshaft 60 can be adjusted/made to any length. The sheaves 40 and 50 can be made any size and can be made to have any number of belts. The pulleys in the pulley system 70 can be made any size and can be made to use any number of belts.

Figure 2:
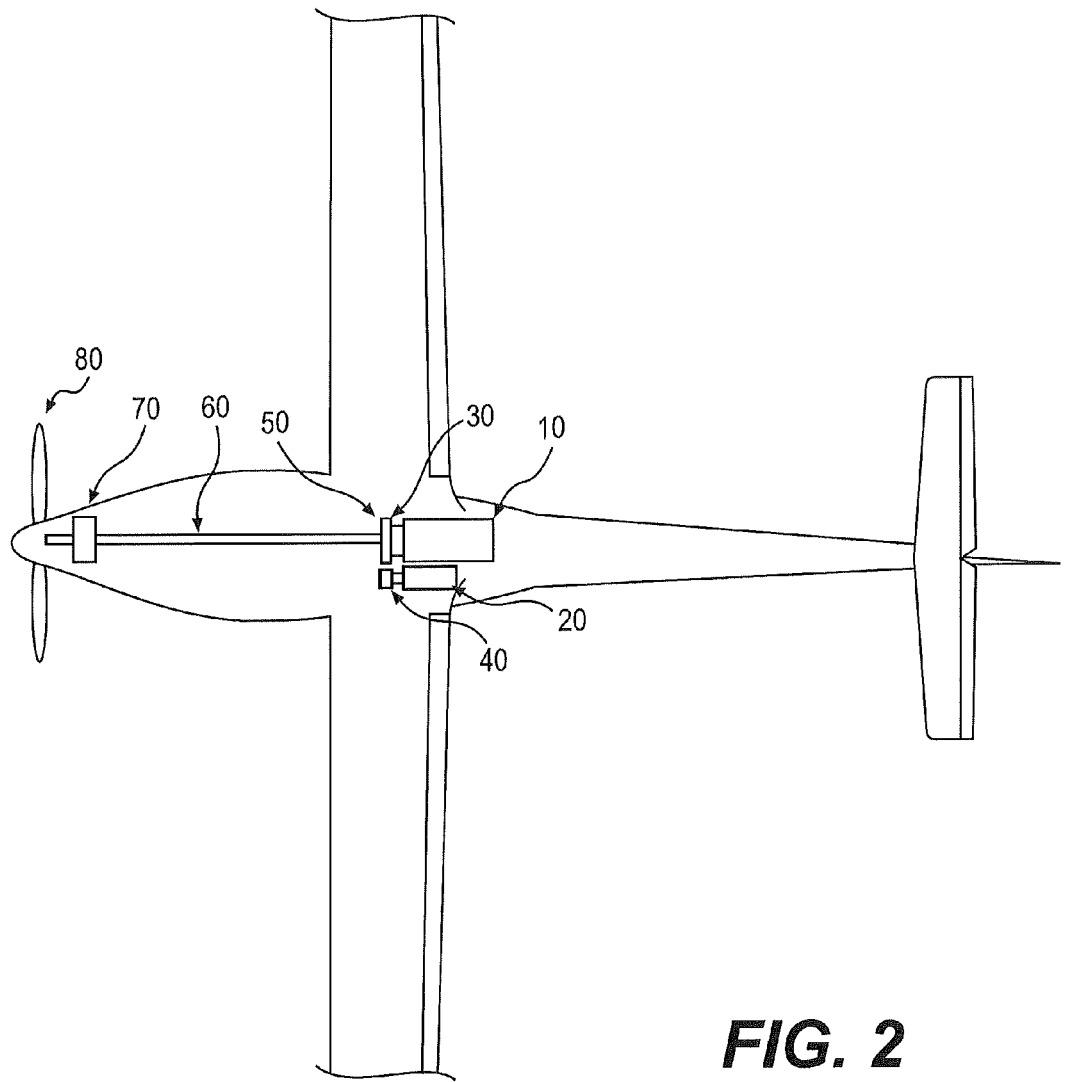
FIG. 2 illustrates a layout of the internal combustion engine, electric motor, propeller, and hybrid assembly in an aircraft fuselage in accordance with an exemplary embodiment of the invention.

FIG. 2 illustrates a layout of the internal combustion engine 10, electric motor 20, propeller 80, and hybrid clutch and pulley assembly in an airplane's fuselage in an exemplary embodiment. If the propeller 80 can be positioned in-line with the driveshaft 60 then the pulley system 70 can be eliminated from the overall propulsion system.

Figure 3:
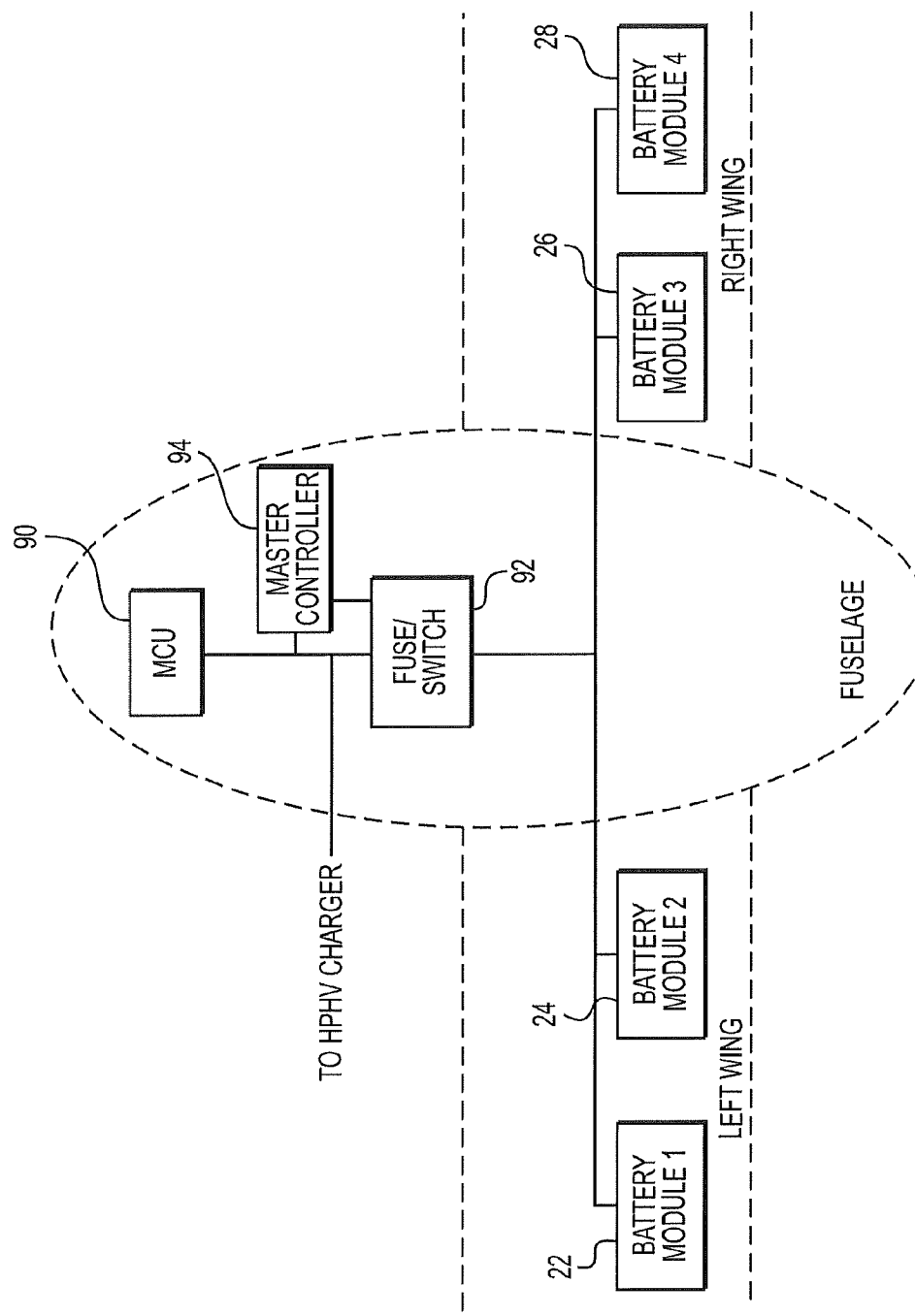
FIG. 3 illustrates the battery modules and master controller unit (MCU) for powering the electric motor in accordance with an exemplary embodiment of the invention.
Figure 4:
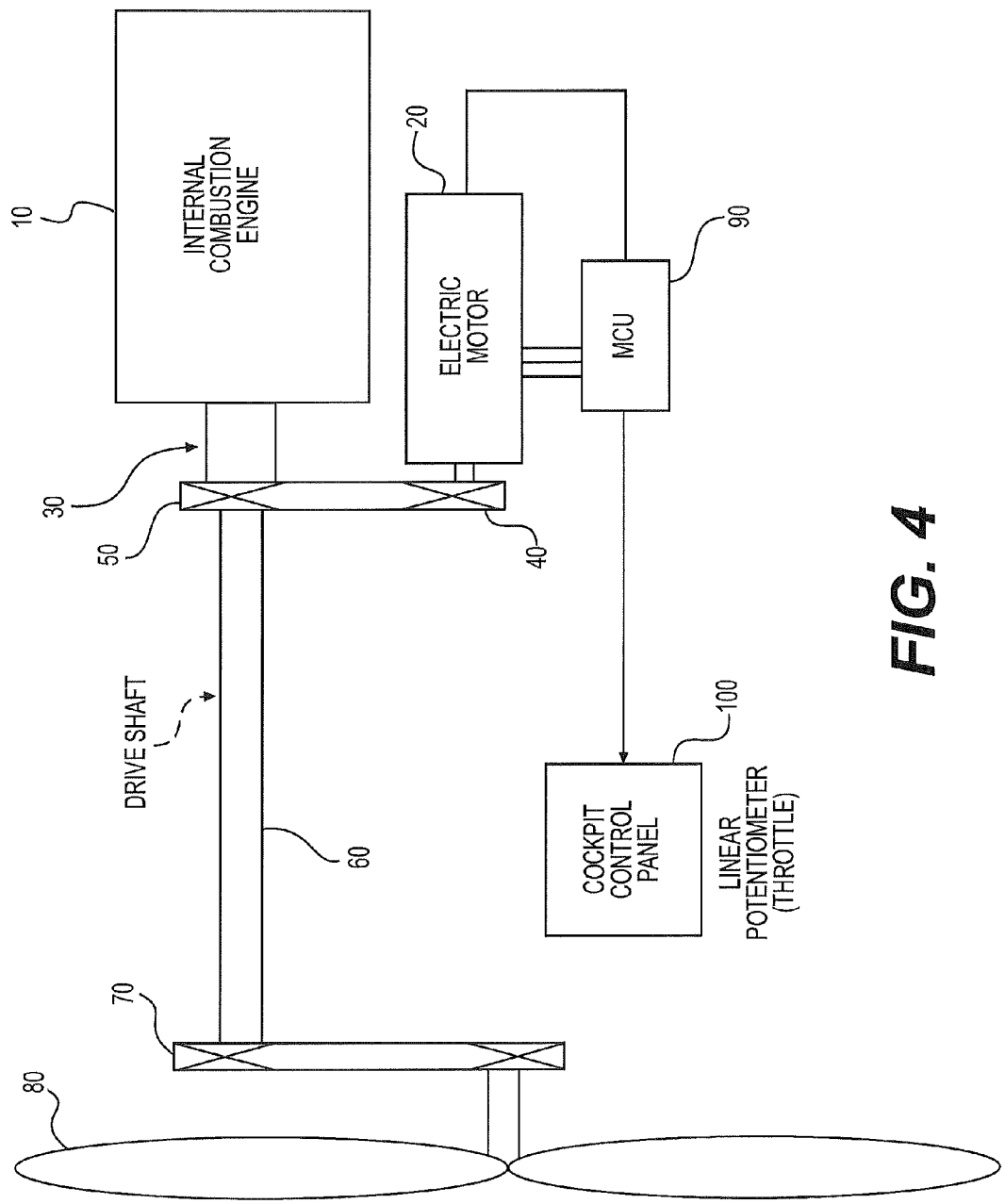
FIG. 4 illustrates the hybrid propulsion system of FIG. 1 further including the master controller unit and cockpit control panel/linear potentiometer in accordance with an exemplary embodiment of the invention.

In exemplary embodiments, as further illustrated in FIGS. 3-4, several battery modules 22, 24, 26, 28 are combined together to provide the proper voltage to the motor controller unit 90 in order to power the electric motor 20. A linear potentiometer (throttle) can be integrated into the cockpit control panel 100 to regulate the electric motor speed. Four battery modules can be placed in the wings, two in the left wing 22, 24 and two in the right wing 26, 28, and a fifth battery module (not shown) can be placed in the fuselage aft of the internal combustion engine.

In alternate embodiments, for airplanes having internal combustion engines 10 that are mounted in the nose area and in which the engine location cannot be moved, the hybrid assembly can be attached to the internal combustion engine propeller flange and the propeller 80 mounted to the hybrid assembly. The electric motor 20 is then mounted to the internal combustion engine 10 and drive belts attached to the hybrid drive belt sheave. The nose cowling is then extended or a new one made to encompass the space displaced by the hybrid clutch and pulley assembly.

These and other alternative embodiments allow the airplane to be flown using either an internal combustion engine 10 or an electric motor 20, or by switching from one system to the other system in flight. Alternation of power from one system to the other will not cause the airplane to lose cruise altitude or cruise speed.

In operation, the internal combustion engine 10 provides the required power to drive the propeller 80 enabling the airplane to takeoff and climb to a cruising altitude. Once the airplane is at cruising altitude, the electrical system of the electric motor 20 can be activated and the battery management system can be energized. The internal combustion engine 10 is then throttled back, and the electric motor 20 is then throttled up enabling the internal combustion engine to be turned off. The electric motor throttle 100 can then be adjusted as needed in order to maintain cruise speed and altitude.

The process can be reversed so as to transition from operation with power supplied by the electric motor 20 to power supplied from the internal combustion engine 10. The electric motor throttle 100 is decreased and the internal combustion engine 10 is restarted. When the internal combustion engine is on, the electric motor 20 and the battery management system are turned off and the internal combustion engine throttled up to maintain cruise speed and altitude. This process can be repeated multiple times, dependent upon the energy remaining within the battery modules 22, 24, 26, 28. The airplane can use either the internal combustion engine 10 or the electric motor 20 for the descent and landing portion of the flight.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the invention is defined solely by the appended claims.

What is claimed:

1. A hybrid aircraft propulsion system comprising:
   a driveshaft;
   an internal combustion engine mounted on the driveshaft to provide power for driving an aircraft propeller;
   an electric motor offset from the internal combustion motor and coupled to the drive shaft to provide power to the aircraft propeller independently of the power supplied by the internal combustion engine;
   a hybrid assembly interconnecting the internal combustion engine and electric motor to the driveshaft such that the electric motor and internal combustion engine are operable in parallel to power the propeller independently, the hybrid assembly comprising a hybrid clutch attached to a first sheave mounted along the driveshaft, and disposed between the first sheave and the internal combustion engine, and a second sheave driven by the electric motor and coupled to the first sheave so as to translate power from the electric motor to the drive shaft through operation of the hybrid clutch;
   wherein the first and second sheaves are different in size.

2. The hybrid aircraft propulsion system of claim 1 wherein the hybrid assembly comprises a belt housing including at least one drive belt mounted on a plurality of sheaves to connect the electric motor to the driveshaft.

3. The hybrid aircraft propulsion system of claim 1 wherein the electric motor is mounted to the internal combustion engine using a plurality of turnbuckles.

4. The hybrid aircraft propulsion system of claim 1 further comprising a motor controller to control operation of the electric motor.

5. The hybrid aircraft propulsion system of claim 4 further comprising a plurality of battery modules to provide voltage to the motor controller to power the electric motor.

6. The hybrid aircraft propulsion system of claim 1 further comprising a linear potentiometer integrated into a cockpit control panel to regulate a speed of the electric motor.

7. The hybrid aircraft propulsion system of claim 1 wherein the hybrid assembly is mounted on the driveshaft of the internal combustion engine.

8. The hybrid aircraft propulsion system of claim 7 wherein the electric motor is connected by an electric motor shaft to the second sheave of the hybrid assembly.

9. The hybrid aircraft propulsion system of claim 7 further comprising:
   a propeller flange attached to the aircraft propeller;
   a pulley system attached to the propeller flange and the drive shaft to translate power from the driveshaft to the propeller when the propeller is not positioned inline with the driveshaft.

10. The hybrid aircraft propulsion system of claim 7 further comprising a spline connecting the driveshaft to the first sheave of the hybrid assembly.

11. A hybrid aircraft comprising:
    a driveshaft;
    a propeller coupled to the drive shaft so as to be driven thereby;
    an internal combustion engine mounted to the driveshaft to provide power to the aircraft propulsion system;
    an electric motor mounted to the internal combustion engine, the electric motor providing power to the aircraft propulsion system independently of and parallel to the power provided by the internal combustion engine;
    a hybrid assembly attached to a propeller flange of the internal combustion engine, the hybrid assembly connecting the internal combustion engine and the electric motor to the driveshaft, and comprising an internal combustion motor sheave and an electrical motor sheave, at least one drive belt engaging the sheaves so as to translate power from the electric motor to the driveshaft, and a hybrid clutch attached to the internal combustion motor sheave, arranged along the drive shaft adjacent the internal combustion engine;
    wherein the hybrid assembly enables the propeller to be driven by power provided by the internal combustion motor or the electric motor or a combination of both.

12. The hybrid aircraft of claim 11 wherein the hybrid clutch is attached to a first sheave of the hybrid assembly that is mounted on the driveshaft to transmit power to the propeller.

13. The hybrid aircraft of claim 11 further comprising a plurality of batteries to provide voltage to a motor controller to power the electric motor.

14. A method for in flight operation of a propeller-driven hybrid aircraft propulsion system, the hybrid aircraft propulsion system having an internal combustion engine mounted on a driveshaft, an electric motor, and a hybrid assembly interconnecting the internal combustion engine and electric motor to the driveshaft, the hybrid assembly comprising (i) a belt housing including at least one drive belt mounted on a plurality of sheaves to connect the electric motor to the driveshaft on which the internal combustion engine is mounted and (ii) a hybrid clutch that is attached to a first sheave of the plurality of sheaves mounted on the driveshaft and that is disposed between the first sheave and the internal combustion engine, the method comprising:
    activating an electrical system of the electric motor;
    energizing a battery management system to control operation of the electric motor;
    decreasing internal combustion engine throttle power level;
    increasing an electric motor throttle power level;
    turning off the internal combustion engine; and
    adjusting the electric motor throttle power level to maintain a speed and a cruising altitude of the aircraft.

15. The method for in flight operation of a propeller-driven hybrid aircraft propulsion system of claim 14 further comprises transitioning from operation with power supplied by the electric motor to power generated by the internal combustion engine.

16. The method for in flight operation of a propeller-driven hybrid aircraft propulsion system of claim 15 wherein transitioning comprises:
    decreasing the electric motor throttle power level;
    restarting the internal combustion engine;
    increasing the internal combustion engine throttle power level; and
    turning off the electric motor and battery management system.

17. The method for in flight operation of a propeller-driven hybrid aircraft propulsion system of claim 16 further comprising switching between operation with power supplied by the electric motor and power generated by the internal combustion engine dependent upon the energy supplied from a battery module.

18. The method for in flight operation of a propeller-driven hybrid aircraft propulsion system of claim 17 further comprising using either the internal combustion engine or the electric motor for a descent and a landing portion of a flight.

19. The hybrid aircraft of claim 11, wherein the propeller comprises a propeller directly attached to the drive shaft.

20. The hybrid aircraft of claim 11, wherein the propeller comprises a propeller flange coupled to the drive shaft through a pulley system attached to the propeller flange and the drive shaft.

21. The hybrid aircraft of claim 11, wherein an assembly of the internal combustion engine and the electric motor is mounted to a portion of the aircraft disposed between a first and second wing.

22. The hybrid aircraft propulsion system of claim 1, wherein the aircraft propeller is mounted directly to the drive shaft.

23. The hybrid aircraft propulsion system of claim 5, wherein the motor controller, in response to a determination that the hybrid aircraft has reached a cruising altitude, activates a battery module of plurality of battery modules to provide to power the electric motor, and wherein after power is provided to the electric motor, power to the internal combustion engine is reduced and the motor controller increases power to the electric motor so that the internal combustion engine can be turned off.

* * * * *